(12) United States Patent
Iovieno

(10) Patent No.: US 9,667,662 B2
(45) Date of Patent: *May 30, 2017

(54) LAWFUL INTERCEPTION FOR TARGETS IN A PROXY MOBILE INTERNET PROTOCOL NETWORK

(71) Applicant: Telefonaktiebolaget L M Ericsson (publ), Stockholm (SE)

(72) Inventor: Maurizio Iovieno, Mercata San Severino (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 376 days.

This patent is subject to a terminal disclaimer.

(21) Appl. No.: 14/308,922

(22) Filed: Jun. 19, 2014

(65) Prior Publication Data

US 2014/0293836 A1    Oct. 2, 2014

Related U.S. Application Data

(63) Continuation of application No. 13/000,727, filed as application No. PCT/EP2008/059727 on Jul. 24, 2008, now Pat. No. 8,792,505.

(51) Int. Cl.
| | |
|---|---|
| H04L 12/28 | (2006.01) |
| H04L 29/06 | (2006.01) |
| H04M 3/22 | (2006.01) |
| H04W 12/02 | (2009.01) |
| H04J 1/16 | (2006.01) |
| H04M 7/00 | (2006.01) |

(52) U.S. Cl.
CPC .......... *H04L 63/30* (2013.01); *H04M 3/2281* (2013.01); *H04W 12/02* (2013.01); *H04M 7/006* (2013.01)

(58) Field of Classification Search
USPC ................. 370/401, 252, 329, 419
See application file for complete search history.

(56) References Cited

U.S. PATENT DOCUMENTS 7,277,435 B2   10/2007   Keller
7,979,529 B2    7/2011   Kreusch et al.
(Continued)

FOREIGN PATENT DOCUMENTS

EP    1 780 945 A1    5/2007
RU    2 273 960 C2    4/2006
(Continued)

OTHER PUBLICATIONS

WO 2008/067849 A1, Jun. 12, 2008, WIPO.*
(Continued)

*Primary Examiner* — John Pezzlo
(74) *Attorney, Agent, or Firm* — Patent Portfolio Builders PLLC

(57) ABSTRACT

A method for providing Law Enforcement Agencies in a telecommunications network with interception and/or retention data related to a target mobile node in a Proxy Mobile Internet Protocol domain connected to the telecommunications network through a Mobile Access Gateway, comprises the steps of configuring at least one of said Mobile Access Gateway and a Local Mobility Anchor to operate as Intercepting Control Elements or Data Retention sources.

17 Claims, 4 Drawing Sheets

(56) References Cited

U.S. PATENT DOCUMENTS

| | | | |
|---|---|---|---|
| 8,862,095 B2* | 10/2014 | Popoviciu | H04L 12/2602 370/338 |
| 2002/0078384 A1 | 6/2002 | Hippelainen | |
| 2005/0094651 A1 | 5/2005 | Lutz et al. | |
| 2009/0010206 A1 | 1/2009 | Giaretta et al. | |
| 2010/0217837 A1 | 8/2010 | Ansari et al. | |
| 2012/0084425 A1* | 4/2012 | Riley | H04M 15/00 709/223 |

FOREIGN PATENT DOCUMENTS

| | | |
|---|---|---|
| RU | 2 280 331 C2 | 7/2006 |
| WO | 2008/067849 A1 | 6/2008 |

OTHER PUBLICATIONS

ETSI; "Lawful Interception (LI); Retained data handling; Handover interface for the request and delivery of retained data"; ETSI TS 102 657 V1:1.1 (Nov. 2008) Technical Specification; Nov. 2008; pp. 1-84.

S. Gundavelli, et al.; "Proxy Mobile IPv6"; Network Working Group; Rfc 5213; Aug. 2008; pp. 1-92.

Official Journal of the European Union; "Directive 2006/24/EC of the European Parliament and of the Council of Mar. 15, 2006 on the retention of data generated or processed in connection with the provision of publicly available electronic communications services or of public communications networks and amending Directive 2002/58/EC"; Apr. 13, 2006; pp. L105/54-L105/63.

GPP-Standards, 2500 Wilson Boulevard Suite 300, Arlington, Virginia 22201 USA, Dec. 31, 2007, XP040278698, pp. 9-11 and 13-24.

Universal Mobile Telecommunications System (UMTS); 3G Security; Lawful Intercept architecture and functions (3GPP TS 133 107 version 7.7.0 Release 7); ETSI TS 133 107; ETSI Standards, LIS, Sophia Antipolis Cedex France; vol. 3-SA3, No. V7.7.0; Oct. 1, 2007; XP 014040244; pp. 9-14 and 29-50.

Ericsson "Updated on TS 33.107 to Support LI for EPS"; 3GPP Draft; SA3LI08_042 Vancouver Outcome CR-33107 EPC_Modification, 3rd Generation Partnership Project (3GPP) Mobile Competence Centre; Apr. 23, 2008; XP050282186; pp. 1 and 5-9.

NTT Docomo et al., "GRE Key Exchange Using PMIP" 3GPP Draft; 23402_CR0100_(Rel-8)_S2-081048_GRE, 3rd Generation Partnership Project (3GPP) Mobile Competence Centre; Mar. 2, 2008; XP050210592 ; pp. 1 and 4.

"Lawful Interception (LI); Retained Data; ETSI TS 102 656"; ETSI Standards, Nov. 1, 2007; XP014040514; pp. 6-13.

3GPP Access to Trusted Non-3Gpp IP Access Handover with PMIPv6 on S2a and chained S8a/S2a; 3GPP TS 23.402 V8.0.0; release Dec. 8, 2007; XP40278698; pp. 91-112.

3GPP Access to Trusted Non-3Gpp IP Access Handover with PMIPv6 on S2a and chained S8a/S2a; 3GPP TS 23.402 V8.0.0; release Dec. 8, 2007; XP40278698; pp. 91-131.

3GPP Access to Trusted Non-3Gpp IP Access Handover with PMIPv6 on S2a and chained S8a/S2a; 3GPP TS 23.402 V8.0.0; release Dec. 8, 2007; XP40278698; pp. 45-90.

International Search Report and Written Opinion issued in PCT/EP2008/0597247, dated Jul. 22, 2009.

International Preliminary Report on Patentability PCT/EP2008/0597247, dated Nov. 2, 2010.

Office Action dated Mar. 13, 2013 in corresponding Chinese Application No. 200880130550.8.

Chinese Second Office Action issued in corresponding Chinese Patent Application No. 200880130550.8 on Sep. 10, 2013.

Supplementary Search Report issued corresponding Chinese Patent Application No. 200880130550.8 dated Sep. 2, 2013.

A Decision to Grant A Patent For Invention in corresponding Russian Patent Application No. 2011106750/08(009595 dated May 22, 2012. (References WO 2008/067849 A1 and NPL ETSI TS 133.107 were submitted with an Information Disclosure Statement on Jun. 19, 2014.)

* cited by examiner

LAWFUL INTERCEPTION FOR TARGETS IN A PROXY MOBILE INTERNET PROTOCOL NETWORK

CROSS-REFERENCE TO RELATED APPLICATIONS

This application is a continuation of U.S. patent application Ser. No. 13/000,727, filed on Mar. 28, 2011, entitled "LAWFUL INTERCEPTION FOR TARGETS IN A PROXY MOBILE INTERNET PROTOCOL NETWORK", which is a 371 of, and claims priority from, PCT/EP2008/059727, filed on Jul. 24, 2008, entitled "LAWFUL INTERCEPTION FOR TARGETS IN A PROXY MOBILE INTERNET PROTOCOL NETWORK", the disclosure of which is incorporated here by reference.

TECHNICAL FIELD

The preset invention relates to methods and arrangements in a telecommunications system for providing retention or interception data to lawful interception requesting entities. Particularly, the invention relates to lawful interception of a target when Proxy Mobile Internet Protocol based architectures and protocols are used in the telecommunication network.

BACKGROUND

In many countries, operators and Internet service providers are obliged by legal requirements to provide traffic data, including stored data, and content of communications generated from public telecommunications and Internet services for specific target subscribers based on request from Authorities (Law Enforcement Agencies) for the purpose of detection, investigation and prosecution of crime and criminal offences, including terrorism.

These requirements have already been met by methods and systems that allow lawful interception of a target in a variety of 3GPP telecommunication networks, i.e. telecommunications networks covered by 3GPP standards.

Initiatives within the European Union (EU) regulate the legal basis for data retention. For instance, the EU Parliament adopted a set of amendments that approved the Council's proposed directive on data retention (Directive 2006/24/EC). In this directive, initial requirements and how an extension of the directive will be handled are described. Consequently, an essential part of operator's effort to comply with current legislation is to secure that processes and tools can be adapted to handle an expansion of the scope for data retention.

Technical specification ETSI DTS/LI-00039 gives guidance for the delivery and associated issues of retained data of telecommunications and subscribers. In particular, such specification provides a set of requirements relating to Handover Interfaces for the retained traffic data and subscriber data by law enforcement and other authorized requesting authorities. Technical Specification ETSI DTS/LI-00033 contains handover requirements and a handover specification for the data that is identified in EU Directive 2006/24/EU on retained data.

In the ever ongoing process of integrating heterogeneous communications networks and protocols, 3GPP is now specifying an Evolved Packet System (EPS), which allows to use some IETF protocols for motility such as Proxy Mobile Internet Protocol v6, whose functional architecture and related protocols are defined in the draft IETF "Proxy Mobile IPv6". To this purpose, 3GPP specifies in TS 23.402 "Architecture enhancements for non-3GPP Accesses (Release 8)" an architecture that allows using PMIPv6 protocols and non-3GPP terminals to use a 3GPP network to get services from operators.

Clearly, each operator using a 3GPP based network is still required to satisfy legal and regulatory requirements for targets that may include non-3GPP terminals, in accordance with the 3GPP standard Lawful Interception architecture defined in 3GPP TS 33.107 "3G Security; Lawful Interception Architecture and Functions (Release 8)".

Unfortunately, the existing Lawful Interception solutions for 3GPP network architectures do not cover the case in which mobility of the terminal is handled by the use of IETF protocols such as Proxy Mobile Internet Protocol v6 (PMIPv6).

The case in which a non-3GPP access is used to get telecommunication services from a 3GPP network is not covered, either.

SUMMARY

The aim of the present invention is to overcome the above mentioned drawbacks.

Within this aim, an object of the invention is to provide methods and systems that may allow lawful interception functionalities to be applied with respect to non-3GPP terminals and, in particular, on target for which Proxy Mobile Internet Protocol architecture and functions are used in the network.

This aim and other objects which will become better apparent hereinafter are achieved by a method for providing Law Enforcement Agencies in a telecommunications network with retention or interception results related to a target mobile node in a Proxy Mobile Internet Protocol domain and connected to the telecommunications network through a Mobile Access Gateway, comprising the steps of configuring at least one of said Mobile Access Gateway and a Local Mobility Anchor to operate as Intercepting Control Elements.

The above aim and objects are also achieved by a Lawful Interception System for retention of traffic data or interception of traffic data and communication content related to a target mobile node in a Proxy Mobile Internet Protocol domain, connected to a telecommunications network through a Mobile Access Gateway are configured to operate as Intercepting Control Elements.

The present invention also concerns computer programs comprising portions of software codes in order to implement the method as described above when operated at a processor of an Intercepting Control Element or a Data Retention source. Particularly, a computer program may be loadable into at least one of a Mobile Access Gateway or a Local Mobility Anchor to Configure said at least Mobile Access Gateway or Local Mobility Anchor as Intercepting Control Element or Data Retention source operable in a Lawful Interception or Data Retention system according to the invention. Such a computer program can be stored on a computer readable medium, which may be a permanent or rewritable memory within the Intercepting Control Element or Data Retention source or can be located externally. The respective computer program may also by transferred to the Intercepting Control Element or Data Retention source, for example via a cable or a wireless link as a sequence of signals.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
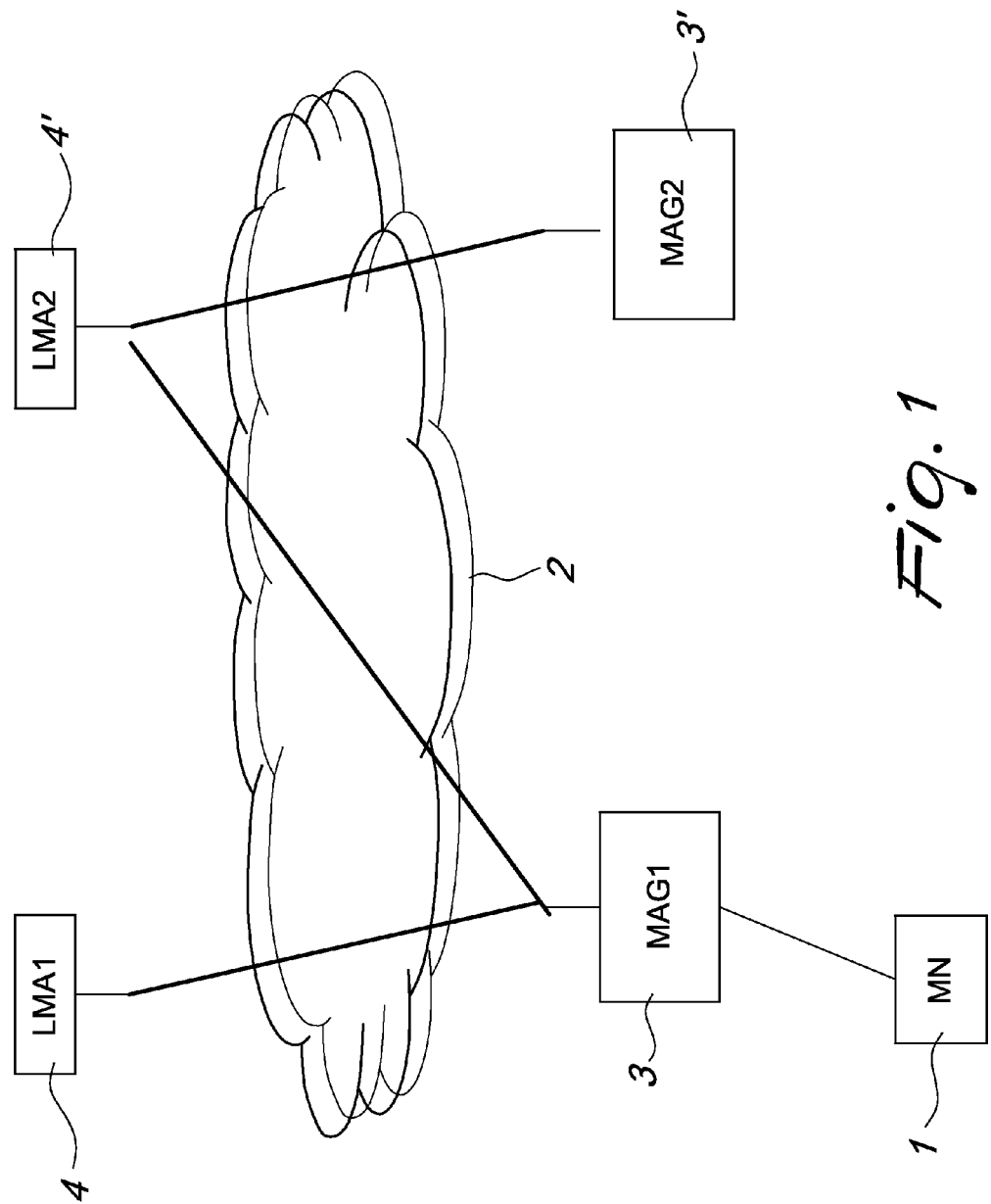
FIG. 1 shows a functional architecture of a Mobile Node in a Proxy Mobile Internet Protocol based network.

FIG. 1 shows a functional architecture of a Mobile Node (1) in a Proxy Mobile Internet Protocol based network.

Once mobile node 1 enters a Proxy Mobile Internet Protocol v6 domain 2 and attaches to an access link, a Mobile Access Gateway 3 (MAG) on that access link, after identifying the mobile node 1 and acquiring its identity, determines if the mobile node 1 is authorized for the network-based mobility management service.

If the network 2 has determined that the network-based mobility management service should be offered to that mobile node 1, the network 2 ensures that the mobile node 1 using any of the address configuration mechanisms permitted by the network may obtain address configuration on the connected interface and move anywhere in that Proxy Mobile Internet Protocol domain.

The obtained address configuration may include the address or addresses from its home network prefix or prefixes, the default-router address on the link and other related configuration parameters.

From the perspective of mobile node 1, the entire Proxy Mobile Internet Protocol domain may appear as a single link. The network 2 may take care that the mobile node 1 believes it is always on the same link at which it obtained its initial address configuration, even its point of attachment in that network has changed.

Mobile node 1 may be an IPv4-only node, IPv6-only node or a dual IPv4/IPv6 node. Based on what is enabled in the network for that mobile node, the mobile node will be able to obtain an IPv4, IPv6 or dual IPv4/IPv6 addresses and move anywhere in that Proxy Mobile Internet Protocol domain. The skilled in the art appreciates that future versions of the Internet Protocol may be used, as far as the technical definition the protocol maintains similar features to Proxy Mobile Internet Protocol v6.

If mobile node 1 performs an inter-interface handoff by moving its address configuration from one interface to the other and if a Local Mobility Anchor 4 (LMA) receives a handoff hint from the serving Mobile Access Gateway 3 (MAG) about the same, the Local Mobility Anchor 4 may assign the same home network prefix or prefixes that it previously assigned prior to the handoff.

Mobile node 1 may also be able to perform a handoff by changing its point of attachment from a first Mobile Access Gateway 3 to a different Mobile Access Gateway 3' using the same interface and may thus be able to retain the address configuration on the attached interface.

Procedures between mobile node 1 and the defined functional entities and signalling between Mobile Access Gateways 3 and local mobility Anchors 4 needed to set up a tunnel to carry packets between Mobile Node 1 and the Mobile Access Gateways are known to the skilled in the art as being defined in the draft IETF "Proxy Mobile IPv6, and are not here described in detail.

Such procedures may include for instance Router solicitation and Router Advertisement. Proxy Binding Update and Proxy Binding Accept, Deregistration Proxy Binding Update. The format of the tunnelled packets is also specified and can be used in a preferred embodiment of the present invention.

The identify of a mobile node in the Proxy Mobile Internet Protocol v6 domain is the stable identifier of a mobile node 1, which the mobility entities in a Proxy Mobile Internet Protocol v6 domain can acquire and use for predictably identifying a mobile node. This may typically be an identifier such as a Network Access Identifier (NAI).

Figure 2:
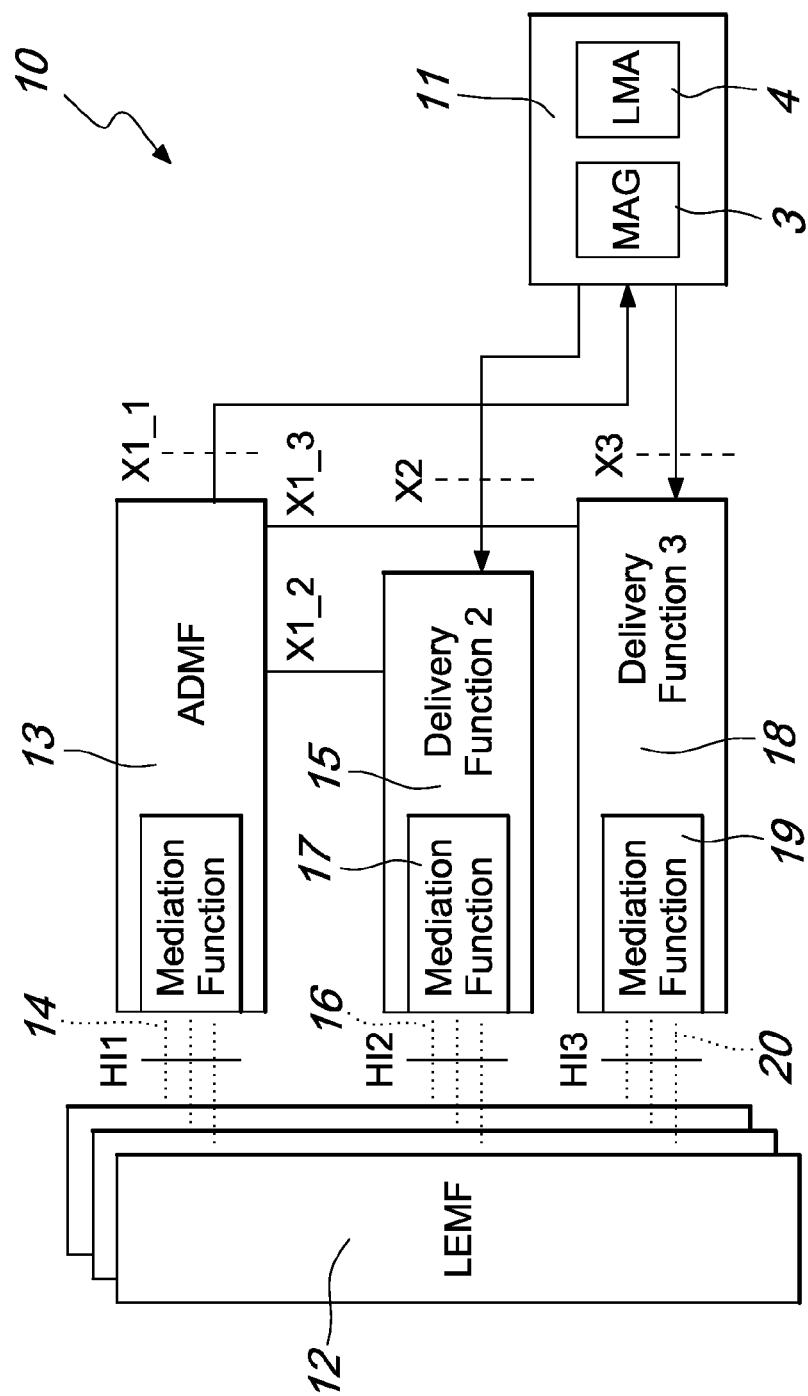
FIG. 2 is an arrangement of a Lawful Interception System according to a first aspect of the present invention, in which Mobile Access Gateways or Local Mobility Anchors act as Intercepting Control Elements.
Figure 4:
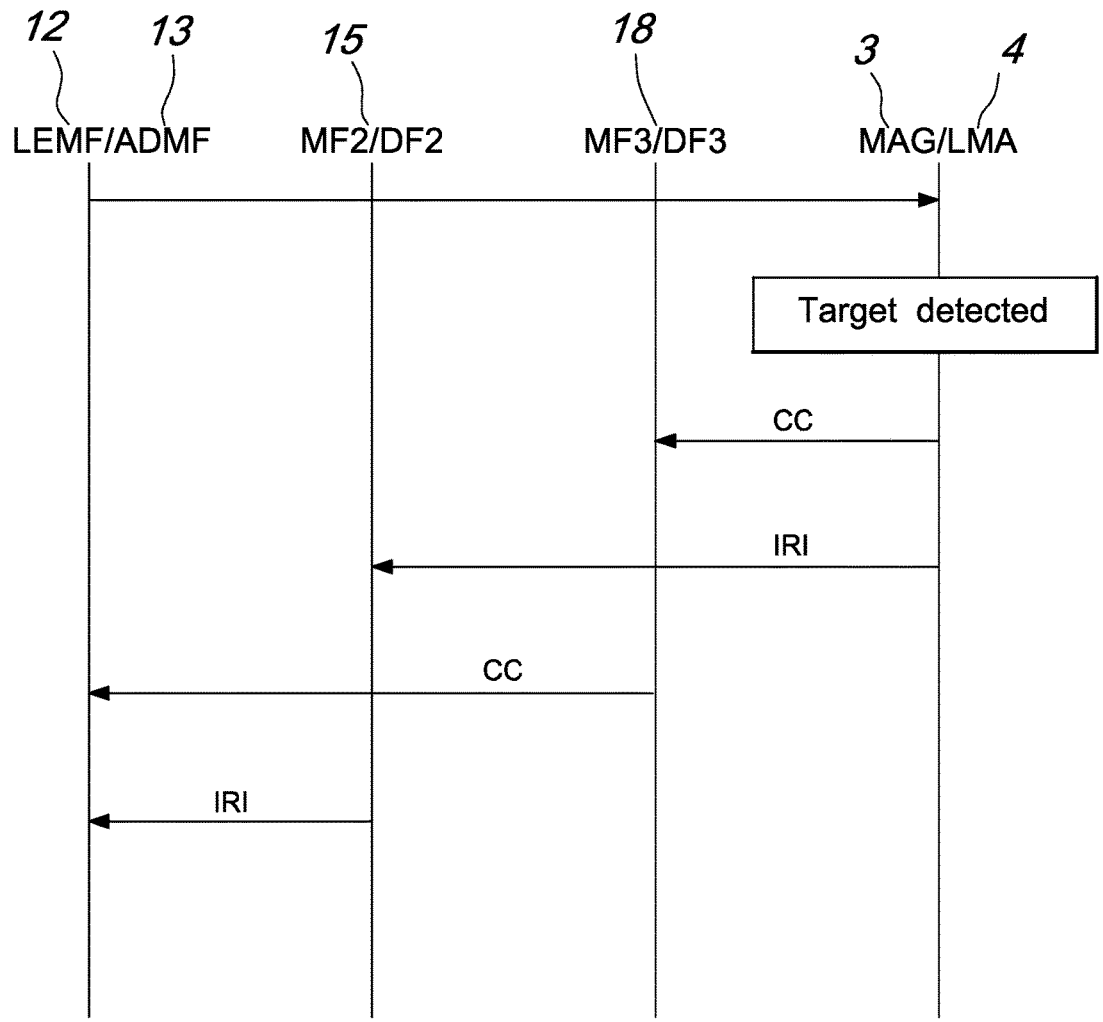
FIG. 4 is a flow diagram showing data interception according to one aspect of the invention.

With reference to FIGS. 2 and 4, an architecture for accessing communications related data in a Lawful Interception system 10 according to the invention is disclosed.

Lawful Interception system 10 may comprise an Intercepting Control Elements (ICEs) 11 providing the user equipment of the target user with access to the telecommunications network.

According to the intervention, Local Mobility Anchor 4 and/or Mobile Access Gateway 3 are defined as Intercepting Control Elements 11 in order to intercept signaling and content of communication for a mobile node 1 that is a target for Lawful Interception. Network nodes including Local Mobility Anchor 4 and/or Mobile Access Gateway 3 may be equally defined as Intercepting Control Elements.

Lawful Interception system 10 according to the invention may further comprise one or more Law Enforcement Monitoring Facilities (LEMFs) 12, through which respective Law Enforcement Agencies (LEAs) may receive interception information.

An Administration Function (ADMF) entity 13 may be further configured for sending target identity and Lawful Interception authorization data received from the respective Law Enforcement Agencies to the Intercepting Control Elements 11.

Administration Function 13 may interface through a first Handover Interface 14 (HI1) with all the Law Enforcement Agencies that may require interception in the intercepting network and may keep the intercept activities of individual Law Enforcement Agencies separate and interface to the intercepting network.

Administration Function 13 may also be used to hide from Intercepting Control Elements 11 that multiple activations by different Law Enforcement Agencies on the same target may have active.

Moreover, Administration Function 13 may be partitioned to ensure separation of provisioning data from different agencies.

Every physical Intercepting Control Element 11 may be linked to Administration Function 13 by means of its own $X1_{13}$ 1 interface. Consequently, every single Intercepting Control Element 11 may perform interception, i.e. activation, deactivation, interrogation as well as invocation, independently from other Intercepting Control Elements 11.

In order to deliver the interception information to Law Enforcement Agencies, two Delivery Functions (DF) entities may be provided, each exchanging respective portions of information with Administration Function 13, through X1_2 and X1_3 interfaces, and the Law Enforcement Monitoring Facility 12.

In particular, a Delivery Function DF2 entity 15 may be configured to receive Intercept Related Information (IRI)

from Intercepting Control Element 11, through an X2 interface, and to convert and distribute the Intercept Related Information to the relevant Law Enforcement Agencies via a second Handover Interface 16 (HI2) by means of a Mediation Function (MF) 17.

The Intercept Related Information may be a collection of information or data associated with telecommunication services involving the target identity, such as call associated information or data, e.g. unsuccessful call attempts, service associated information or data, e.g. service profile management by subscriber, and location information.

A Delivery Function DF3 entity 18 may be configured to receive Content of Communications (CC) information from Intercepting Control Elements 11 through an X3 interface, and to convert and distribute such information to the relevant Law Enforcement Agency through Mediation Function 19 and a third Handover Interface (HI3) 20.

The Content of Communications may be information different from the Intercept Related Information, which is exchanged between two or more users of a telecommunications service and, more in general, may include information which, as part of some telecommunications service, could be stored by one user for subsequent retrieval by another user.

In operation according to the intervention, activation of Lawful Interception for a specific target may be performed on the X1_1 interface by using the Network Access Identifier.

Intercept Related Information may be provided by the Local Mobility Anchor 4 and the Mobile Access Gateway 3 on the X2 interface, each time that a Proxy Mobile Internet Protocol based event is detected in the Local Mobility Anchor 4 or in the Mobile Access Gateway 3.

Again, such events may include Router solicitation and Advertisement, Proxy Binding Update and Accept and Deregistration Proxy Binding Update.

The skilled in art appreciates that the applicable parameters as defined in the Proxy Mobile Internet Protocol for each message may be reported. The skilled in the art also appreciates that Intercepted Related Information may be provided by other networks nodes implementing the Local Mobility Anchor and/or Mobile Access Gateway functionalities.

Intercepted Content of communication for a Mobile Node 1 that is target for interception may be duplicated by the Local Mobile Anchor 4 and/or by the Mobile Access Gateway over the X3 interface. Intercepted Content of communication may be duplicated by other network nodes that implement the Local Mobility Anchor and/or Mobile Access Gateway functions.

The present invention thus defines a mechanism that can be used in order to allow lawful interception of a target when Proxy Mobile Internet Protocol based network architectures and protocols are used, with particular reference to Proxy Mobile Internet Protocol v6. The invention has been described in terms of IETF defined logical functions but it is applicable to any network node implementing such logical functions.

All the traffic information may be used for proper storage in order to satisfy possible legal requirements concerning data retention.

Figure 3:
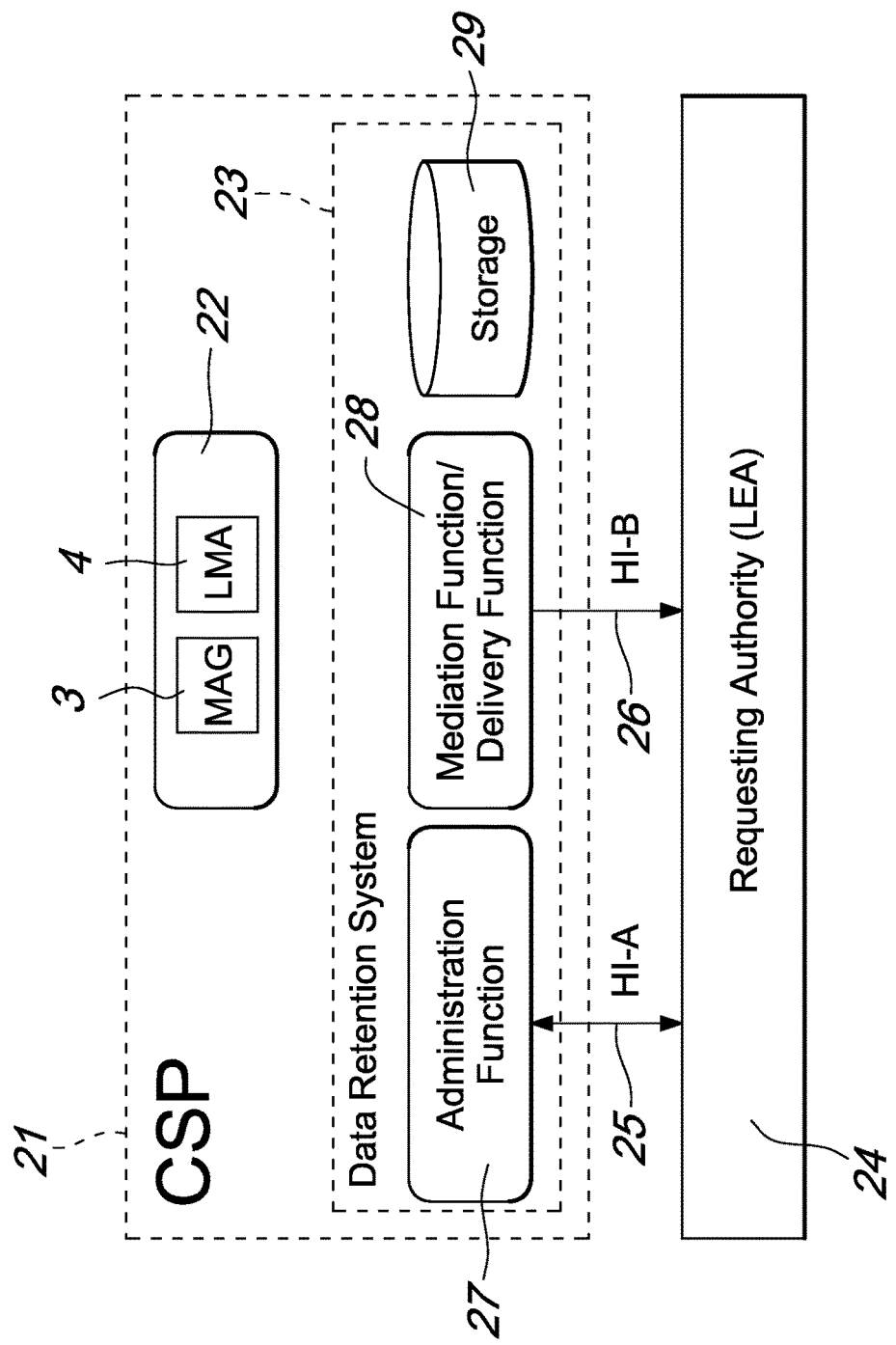
FIG. 3 is an arrangement of a Lawful Interception system according to a second aspect of the present invention, in which Mobile Access Gateways or Local Mobility Anchors act as Data Retention sources.

In this respect, FIG. 3 depicts an arrangement for retaining data in a Communication Service Provider 21 (CSP) according to the present invention. Specifically, the Communication Service Provider 21 may be provided with a Data Retention System (DRS) 23 for exchanging retained data relating information with a Requesting Authority 24, which may be a Lawful Enforcement Agency (LEA).

Communication Service Provider 21 (CSP) may include Mobile Access Gateway 3 and Local Mobility Anchor 4, configured to operate as Data Retention sources.

Data exchange between Communication Service Provider 21 and Requesting Authority 24 may comprise requests from the Requesting Authority 24, corresponding responses from the Data Retention System 23 and other data retention information, such as results of the requests and acknowledgements of receipt. The interfaces through which Communication Service Provider 21 and Data Retention System 23 exchange the above data with the Requesting Authority are denoted as Handover Interfaces.

The generic Handover Interface adopts a two-port structure in which administrative request/response information and Retained Data information are logically separated. In particular, a first Handover Interface port HI-A 25 may be configured to transport various kinds of administrative, request and response information from/to the Requesting Authority 24 and an organization at the Communication Service Provider 21 that is responsible for Retained Data matters, identified by an Administration Function 27.

A second Handover Interface HI-B 26 may be configured to transport the retained data information stored in a repository 29 from the Communication Service Provider 21 to the Requesting Authority 24. The individual retained data parameters have to be sent to the Requesting Authority 24 at least once, if available. To this aim, a Mediation/Delivery function 28 may be provided, for retrieving retained data from repository 9 and forwarding such data to Requesting Authority 24 in a suitable format through the HI-B 26.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art. Particularly, in view of the above description it is clear that, in this text and in the appended claims, the terms Local Mobility Anchor and Mobile Access Gateway encompass any network node implementing such functions.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A method for providing Law Enforcement Agencies in a telecommunications network with interception or retention data related to a target mobile node in a Proxy Mobile Internet Protocol domain connected to the telecommunications network through a Mobile Access Gateway, comprising:

configuring at least one of said Mobile Access Gateway and a Local Mobility Anchor to operate as Intercepting Control Elements; and providing Intercept Related Information said at least one of said Mobile Access Gateway and said Local Mobility Anchor to a Delivery Function through an X2 interface each time a Proxy Mobile Internet Protocol based event is detected in said at least one of said Mobile Access Gateway and said Local Mobility Anchor, respectively, wherein said Proxy Mobile Internet Protocol is Proxy Mobile Internet Protocol v6.

2. The method of claim 1, wherein both the Local Mobility Anchor and the Mobile Access Gateway are configured to operate as Intercepting Control Elements.

3. The method of claim 1, further comprising using the Network Access Identifier associated to the target mobile node to activate lawful interception for the target mobile node.

4. The method according to claim 3, wherein activation of lawful interception on the target mobile node is carried out by the Local Mobility Anchor or the Mobile Access Gateway on a X1_1 interface connecting the Intercepting Control Elements to an Administration Function.

5. The method according to claim 1, wherein said Proxy Mobile Internet Protocol based event includes at least one of the following events: Router Solicitation, Router Advertisement, Proxy Binding Update, Proxy Binding Accept, Deregistration Proxy Binding Update.

6. A Lawful Interception system for interception or retention of data related to a target mobile node in a Proxy Mobile Internet Protocol domain connected to a telecommunications network through a Mobile Access Gateway, wherein at least one of a Local Mobility Anchor and said Mobile Access Gateway are configured to operate as Intercepting Control Elements, are connected to a Delivery Function through a X2 interface and are configured to provide Intercept Related Information to said Delivery Function through said X2 interface each time a Proxy Mobile Internet Protocol based event is detected in said at least one of said Mobile Access Gateway and said Local Mobility Anchor, respectively, wherein said Proxy Mobile Internet Protocol is Proxy Mobile Internet Protocol v6.

7. The Lawful Interception system of claim 6, wherein both the Local Mobility Anchor and the Mobile Access Gateway are configured to operate as Intercepting Control Elements.

8. A Mobile Access Gateway, or any network node implementing such function, configured to operate as Intercepting Control Element for a Lawful Interception system according to claim 6.

9. A Local Mobile Anchor, or any network node implementing such function, configured to operate as Intercepting Control Element for a Lawful Interception system according to claim 6.

10. A telecommunications network comprising a Law Enforcement system according to claim 6.

11. The Lawful Interception system of claim 6, wherein the Network Access Identifier associated to the target mobile node is used to activate lawful interception for the target mobile node.

12. The Lawful Interception system of claim 11, wherein activation of lawful interception on the target mobile node is carried out by the Local Mobility Anchor or the Mobile Access Gateway on a X1_1 interface connecting the Intercepting Control Elements to an Administration Function.

13. The Lawful Interception system of claim 6, wherein said Proxy Mobile Internet Protocol based event includes at least one of the following events: Router Solicitation, Router Advertisement, Proxy Binding Update, Proxy Binding Accept, Deregistration Proxy Binding Update.

14. A non-transitory computer readable medium storing a computer program for providing Law Enforcement Agencies in a telecommunications network with interception or retention data related to a target mobile node in a Proxy Mobile Internet Protocol domain connected to the telecommunications network through a Mobile Access Gateway, wherein when the computer program is executed by at least one of said Mobile Access Gateway and said Local Mobility Anchor causes the at least one of the Mobile Access Gateway and the Local Mobility Anchor to:

configure the at least one of said Mobile Access Gateway and the Local Mobility Anchor to operate as Intercepting Control Elements; and provide Intercept Related Information by said at least one of said Mobile Access Gateway and said Local Mobility Anchor to a Delivery Function through an X2 interface each time a Proxy Mobile Internet Protocol based event is detected in said at least one of said Mobile Access Gateway and said Local Mobility Anchor, respectively, wherein said Proxy Mobile Internet Protocol is Proxy Mobile Internet Protocol v6.

15. The non-transitory computer readable medium of claim 14, wherein the Network Access Identifier associated to the target mobile node is used to activate lawful interception for the target mobile node.

16. The non-transitory computer readable medium of claim 15, wherein activation of lawful interception on the target mobile node is carried out by the Local Mobility Anchor or the Mobile Access Gateway on a X1_1 interface connecting the Intercepting Control Elements to an Administration Function.

17. The non-transitory computer readable medium of claim 14, wherein said Proxy Mobile Internet Protocol based event includes at least one of the following events: Router Solicitation, Router Advertisement, Proxy Binding Update, Proxy Binding Accept, Deregistration Proxy Binding Update.

\* \* \* \* \*

UNITED STATES PATENT AND TRADEMARK OFFICE
CERTIFICATE OF CORRECTION

PATENT NO.        : 9,667,662 B2
APPLICATION NO.   : 14/308922
DATED             : May 30, 2017
INVENTOR(S)       : Iovieno It is certified that error appears in the above-identified patent and that said Letters Patent is hereby corrected as shown below:

On the Title Page

In Item (72), under "Inventor", in Column 1, Lines 1-2, delete "Mercata San Severino" and insert -- Mercato San Severino --, therefor.

On Page 2, in Item (56), under "U.S. PATENT DOCUMENTS", in Column 1, Line 1, delete "Popoviciu" and insert -- Popoviciu et al. --, therefor.

On Page 2, in Item (56), under "U.S. PATENT DOCUMENTS", in Column 1, Line 7, delete "Riley" and insert -- Riley et al. --, therefor.

On Page 2, in Item (56), under "OTHER PUBLICATIONS", in Column 1, Line 13, delete "GPP" and insert -- 3GPP --, therefor.

In the Specification

In Column 1, Line 9, delete "2011," and insert -- 2011, now Pat. No 8,792,505, --, therefor.

In Column 1, Line 20, delete "preset" and insert -- present --, therefor.

In Column 1, Line 61, delete "2006/24/EU" and insert -- 2006/24/EC --, therefor.

In Column 1, Line 65, delete "motility" and insert -- mobility --, therefor.

In Column 2, Line 27, delete "target" and insert -- targets --, therefor.

In Column 2, Line 44, delete "Mobile Access Gateway" and insert -- Mobile Access Gateway, wherein at least one of a Local Mobility Anchor and said Mobile Access Gateway --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*

In Column 2, Line 51, delete "Configure" and insert -- configure --, therefor.

In Column 2, Line 59, delete "by" and insert -- be --, therefor.

In Column 3, Line 5, delete "network;" and insert -- network. --, therefor.

In Column 3, Line 20, delete "(1) in" and insert -- 1 in --, therefor.

In Column 3, Line 67, delete "local mobility" and insert -- Local Mobility --, therefor.

In Column 4, Line 3, delete "IPv6," and insert -- IPv6", --, therefor.

In Column 4, Line 6, delete "Advertisement." and insert -- Advertisement, --, therefor.

In Column 4, Line 11, delete "identify" and insert -- identity --, therefor.

In Column 4, Line 24, delete "intervention," and insert -- invention, --, therefor.

In Column 4, Line 50, delete "have active." and insert -- have been active. --, therefor.

In Column 4, Line 56, delete "X1$_{13}$ 1" and insert -- X1_1 --, therefor.

In Column 4, Line 60, delete "interception" and insert -- intercepted --, therefor.

In Column 5, Line 24, delete "intervention," and insert -- invention, --, therefor.

In Column 5, Line 40, delete "networks" and insert -- network --, therefor.

In Column 5, Line 45, delete "Mobile Anchor" and insert -- Mobility Anchor --, therefor.

In Column 5, Line 67, delete "Lawful" and insert -- Law --, therefor.

In Column 6, Line 4, delete "exchange" and insert -- exchanged --, therefor.

In the Claims

In Column 6, Line 61, in Claim 6, delete "said" and insert -- by said --, therefor.

In Column 7, Lines 45-46, in Claim 10, delete "Law Enforcement system" and insert -- Lawful Interception system --, therefor.